United States Patent
Kim et al.

(10) Patent No.: US 8,906,575 B2
(45) Date of Patent: Dec. 9, 2014

(54) MINIMIZING ELECTRODE CONTAMINATION IN AN ELECTROCHEMICAL CELL

(75) Inventors: Yu Seung Kim, Los Alamos, NM (US); Piotr Zelenay, Los Alamos, NM (US); Christina Johnston, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 69 days.

(21) Appl. No.: 13/412,364

(22) Filed: Mar. 5, 2012

(65) Prior Publication Data

US 2012/0225370 A1    Sep. 6, 2012

Related U.S. Application Data

(60) Provisional application No. 61/449,003, filed on Mar. 3, 2011.

(51) Int. Cl.
 H01M 8/10    (2006.01)
 H01M 8/02    (2006.01)

(52) U.S. Cl.
 CPC .......... *H01M 8/1004* (2013.01); *H01M 8/0291* (2013.01); *Y02E 60/521* (2013.01)
 USPC ........... 429/492; 429/483; 429/523; 429/524; 429/529

(58) Field of Classification Search
 None
 See application file for complete search history.

(56) References Cited

U.S. PATENT DOCUMENTS

| | | | |
|---|---|---|---|
| 6,007,934 A | 12/1999 | Auer et al. | |
| 6,797,667 B2 | 9/2004 | Ruth et al. | |
| 6,893,758 B2 * | 5/2005 | Miyazawa et al. | 429/429 |
| 6,911,278 B2 | 6/2005 | Hiroshima et al. | |
| 7,575,824 B2 | 8/2009 | Kim et al. | |
| 2005/0123809 A1 | 6/2005 | Saunders et al. | |
| 2006/0027101 A1 * | 2/2006 | Pan et al. | 96/4 |
| 2006/0042957 A1 | 3/2006 | He | |
| 2006/0134507 A1 | 6/2006 | Park et al. | |

FOREIGN PATENT DOCUMENTS

WO    WO 2009082666 A1 *    7/2009

OTHER PUBLICATIONS

Attwood et al., "The electrocatalytic oxidation of methanol in acid electrolyte: preparation and characterization of noble metal electrocatalysts supported on pre-treated carbon-fibre papers," Journal of Applied Electrochemistry, 1980, vol. 10, pp. 213-222.
Gasteiger et al., "Activity Benchmarks and Requirements for Pt, Pt-Alloy, and Non-Pt Oxygen Reduction Catalysts for PEMFCs," Applied Catalysis B: Environmental, 2005, vol. 56, pp. 9-35 (available online Nov. 5, 2004).
Piela et al., Ruthenium Crossover in direct Methanol Fuel Cell with Pt-Ru Black Anode, Journal of the Electrochemical Society, 2004, vol. 141, No. 12, pp. A2053-A2059.
Wang, "Recent development of non-platinum catalysts for oxygen reduction reaction," Journal of Power Sources, 2005, vol. 152, pp. 1-15 (available online Aug. 18, 2005).

* cited by examiner

*Primary Examiner* — Milton I Cano
*Assistant Examiner* — Wojciech Haske
(74) *Attorney, Agent, or Firm* — Samuel L. Borkowsky

(57) ABSTRACT

An electrochemical cell assembly that is expected to prevent or at least minimize electrode contamination includes one or more getters that trap a component or components leached from a first electrode and prevents or at least minimizes them from contaminating a second electrode.

1 Claim, 2 Drawing Sheets

MINIMIZING ELECTRODE CONTAMINATION IN AN ELECTROCHEMICAL CELL

RELATED APPLICATIONS

This application claims the benefit of U.S. Provisional Patent Application No. 61/449,003 entitled "Fuel Cell Assembly for Removal of Impurities," filed Mar. 3, 2012, hereby incorporated by reference.

STATEMENT REGARDING FEDERAL RIGHTS

This invention was made with government support under Contract No. DE-AC 52-06 NA 25396, awarded by the U.S. Department of Energy. The government has certain rights in the invention.

BACKGROUND OF INVENTION

The invention relates to preventing or at least minimizing electrode contamination by trapping components of an electrode that leach from the electrode from contaminating another electrode in an assembly, and also to an assembly configured with a getter that traps the leached components.

Metals and alloys are often used to create electrodes in an electrochemical cell. Pt—Ru alloy have been used for anodes and Pt catalysts for cathodes for fuel cells. Similar catalysts have been used in direct methanol fuel cells (DMFCs) for increasing the methanol oxidation reaction rate. Another example is the use of a Ag—Au alloy for the cathode and a Ni catalyst for the anode of an alkaline fuel cell. The Ag—Au alloy improves oxygen reduction kinetics at the cathode while the Ni catalyst improves the hydrogen oxidation reaction rate at the anode. Polymer electrolyte fuel cells (PEFCs), including direct methanol fuel cells (DMFCs), and alkaline fuel cells (AFCs), including alkaline membrane fuel cells (AMFCs), have attracted great interest as an alternative power source for vehicles and portable electronic devices. Two major challenges facing PEFCs are the reduction of material costs and the need for improved performance. Regarding the former challenge, alloy and composite catalysts with low platinum content and non-platinum catalysts based on metals such as ruthenium, palladium, iron, manganese, cobalt, nickel, chromium, molybdenum, and vanadium have been investigated.

When a metal alloy catalyst is used in an anode for a membrane electrochemical assembly (MEA), it has been recognized that one or more components can leach from a first electrode of the assembly and migrate to a second electrode of the assembly. This results in electrode contamination. The component that migrates might not be considered a contaminant of the first electrode, but when it leaches from the first electrode and becomes a part of the second electrode, it contaminates the second electrode. For example, a metal oxide present in the anode of a fuel cell can leach from the anode and migrate to the cathode. The metal oxide might be part of the anode, but when it reaches and becomes a part of the cathode, it has become a contaminant. This contamination results in deteriorating catalytic activity, which leads to a decrease in oxygen reduction reaction (ORR) activity of such cathodes and a corresponding reduction in fuel cell performance. Leachable components include but are not limited to transition metals, non-metals, and organic components (e.g., PtCo, RuSe, Co-PPy) that are present in the first electrode (e.g. the cathode) that can leach from the first electrode and migrate to a second electrode (e.g. the anode) during operation of the electrochemical cell (e.g. a fuel cell). If the electrochemical cell is a fuel cell, this contamination hinders the ability of the now contaminated electrode to oxidize fuels (e.g., hydrogen, methanol, ethanol, and the like at the anode) or reduce oxygen (at the cathode).

A previous approach has involved the use of a sacrificial electrode called a getter to capture leachable components from a fuel cell anode (see: U.S. Pat. No. 7,575,824, incorporated by reference herein) by applying a potential of about 0.1 V between the anode and the sacrificial electrode. The applied potential enabled selective migration of the leachable component(s) to the getter. After trapping the leachable components, the getter was replaced with the fuel cell cathode. This method can effectively remove leachable components from a fuel cell electrode. However, the method required a rather labor intensive getter fabrication, and recycling of the getter has proven difficult and costly.

While contamination of fuel cell electrodes can adversely affect fuel cell performance, methods of preventing contamination are highly variable and may result in loss of electrode material. Therefore, there continues to be a need for a method of preventing contamination of fuel cell electrodes. What is also needed is a method of preventing contamination of fuel cell electrodes in situ in a membrane electrode assembly. In addition, what is needed is a method of improving fuel cell performance based on preventing contamination of an electrode of an assembly by leachable components from another electrode of the assembly.

SUMMARY OF INVENTION

The invention includes an electrochemical cell assembly capable of preventing a component from an electrode from contaminating another electrode of the assembly. The electrochemical cell assembly includes a first electrode, a first ion exchange membrane adjacent the first electrode, a getter adjacent the first ion exchange membrane, a second ion exchange membrane adjacent the getter, and a second electrode adjacent the second ion exchange membrane. The getter of the assembly is capable of trapping components that leach from the first electrode and prevent or at least minimize them from contaminating the second electrode.

The invention includes an electrochemical cell assembly capable of preventing a component from an electrode from contaminating another electrode of the assembly. The electrochemical cell assembly includes a first electrode, a first ion exchange membrane adjacent the first electrode, a first getter adjacent the first ion exchange membrane, a second ion exchange membrane adjacent the first getter, a second getter adjacent the second ion exchange membrane, a third ion exchange membrane adjacent the second getter, and a second electrode adjacent the third ion exchange membrane. The getters of the fuel cell assembly are capable of trapping components that leach from the first electrode to the second electrode.

An electrochemical cell assembly capable of preventing a component from an electrode from contaminating another electrode of the assembly, comprising a first electrode, a getter adjacent the first electrode, an ion exchange membrane adjacent the getter, and a second electrode adjacent the second ion exchange membrane. The getter is capable of trapping components that leach from the first electrode.

Methods of improving performance of a fuel cell are also provided. Accordingly, an aspect of the invention is to provide a method that comprises the steps of: providing a fuel cell having a first electrode with a leachable component, providing an ion exchange membrane adjacent the first electrode, and providing a getter adjacent the ion exchange membrane, providing a voltage across the first electrode and the getter, wherein the voltage is sufficient to drive the leachable component from the first electrode through the membrane to the getter electrode. Alternately, the same assembly can be operated in normal fuel cell mode at an appropriate voltage such that leachable components are trapped by the getter before contaminating the second electrode.

These and other aspects, advantages, and salient features of the present invention will become apparent from the following detailed description, the accompanying drawings, and the appended claims.

BRIEF DESCRIPTION OF THE DRAWINGS

FIG. 1a shows a configuration in which the voltage is provided by an external source of power such as, but not limited to, a potentiostat, a battery, a power generator, and the like. FIG. 1b shows a configuration in which the electrochemical cell is operated at an appropriate voltage (e.g. 0.1 V) such that contamination still becomes trapped on the getter. The entire assemblies can be placed in a liquid electrolyte bath if this is shown to facilitate removal of leachable species. The getters may remain permanently if cell performance is not affected or is improved, or they can be removed if they are detrimental to performance.

DETAILED DESCRIPTION

One simple way to trap leached components from a first electrode and prevent or at least minimize the leached components from contaminating a second electrode may be through the use of a getter. An aspect of the invention relates to trapping components of an electrode that leach from a first electrode of an electrochemical cell. These leached components are trapped to prevent them from contaminating a second electrode. In some embodiments, the first electrode is an anode and the second electrode is a cathode. In other embodiments, the first electrode is a cathode and the second electrode is an anode. In either situation, the element that traps the leached components is a getter, which is an electrode. The leached components become trapped by the getter when a suitable electrochemical potential (i.e. a suitable voltage) is applied between the electrode from which the leached components originate and the getter. If the leached components are leached from an anode, then the potential is applied between the anode and the getter. If the leached components are leached from the cathode, then the potential is applied between the cathode and the getter. For embodiments where in the getter is positioned in between the first and second electrode, the leached components become trapped by the getter in-between the first electrode and the second electrode. The application of a suitable potential facilitates trapping the leached component or components. This invention also covers a case in which n potential is applied to the getter electrodes that then work as absorbents for leachable components. Multiple getters may be used. A getter may have an open structure such as a mesh. Getters that are meshes can be recycled with proper acid treatments. Alternatively, old getters may be replaced with new getters. This may depend on the cost of materials used.

The same assembly can be operated in the normal fuel cell mode at an appropriate voltage such that the getter still traps leached components before they arrive at the second electrode. The assembly can also be placed in a liquid electrolyte bath if this facilitates removal of leachable components.

Figure 1A:
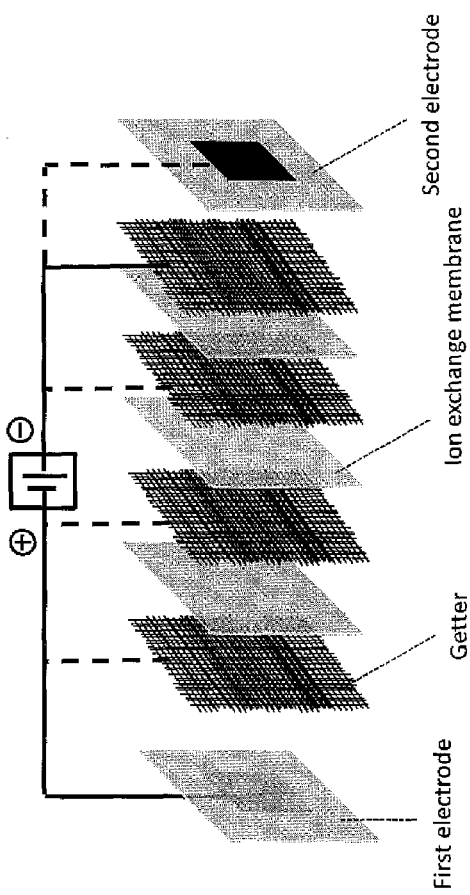
FIG. 1a and FIG. 1b show schematic representations of electrochemical assemblies for trapping a leachable component from a first electrode and prevent, or at least minimize it from contaminating a second electrode of the assembly. A voltage is applied across the first electrode and the getter, the voltage being sufficient to drive the leachable component from the first electrode through the membrane to the getter.

An embodiment electrochemical assembly configuration is shown in FIG. 1a. This assembly is an example of a membrane electrode assembly (MEA) that may be used in, for example, a fuel cell. The MEA includes at minimum a first electrode (e.g. an anode), an ion exchange membrane, a getter, a second ion exchange membrane, and a second electrode (e.g. a cathode). More getters and membranes can be added as required. FIG. 1a has three additional getters and two additional membranes. Each of the anode and cathode include one or more catalyst layers. The catalyst facilitates electrochemical reactions at the first electrode and at the second electrode. Such a MEA may be prepared by attaching suitable materials to ion exchange membranes. For example, in an embodiment for implementing the method, a metal alloy catalyst layer is first prepared and attached to a membrane (the first membrane shown in FIG. 1a) using conventional MEA processing techniques such as painting, spray, or decal transfer method. Next, the getter is attached to the membrane. The getter may be a mesh composed of metal, carbon, or a combination of metal and carbon. Then, a second membrane is positioned adjacent the getter electrode, and a second electrode is positioned adjacent the second membrane. This electrochemical assembly may be used for trapping leached components from the first electrode by applying a potential between the first electrode and the getter(s). Application of a suitable potential causes components that leach from the first electrode to become trapped by the getter, thereby preventing them from contaminating the second electrode. The trapping of leached components provides for an effective and environmentally efficient way of trapping leachable components from one electrode and prevents them from contaminating the other electrode. The trapping of leached components may provide an economical process as well.

Figure 1B:
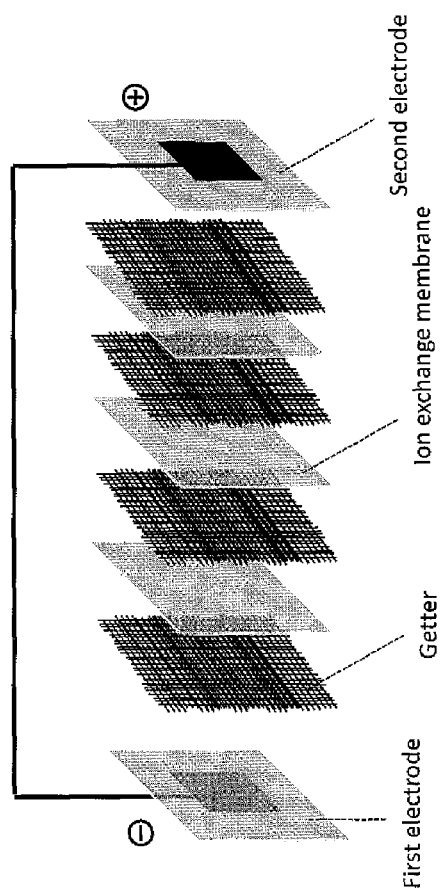

FIG. 1b shows the assembly of FIG. 1a operated in a fuel cell mode. Leachable components still may be trapped at the getter, although their removal from the first electrode may be less efficient.

Figure 2:
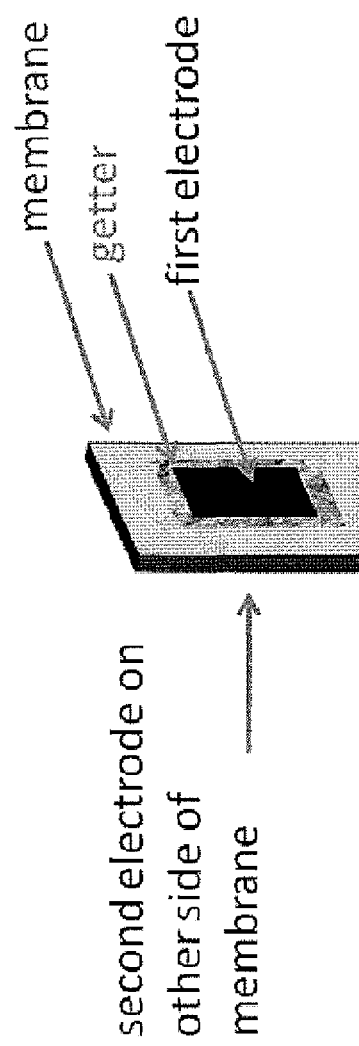
FIG. 2 shows an alternative structure of an electrochemical assembly for trapping leached components on a getter.

FIG. 2 shows a different configuration of an embodiment electrochemical assembly having a getter that is permanently integrated into the assembly. In a typical approach for producing this configuration, a getter is first applied to a membrane and after applying the getter, the anode and the cathode are applied to the membrane, typically by spray-coating, painting, or decal transfer. The getter in the assembly shown in FIG. 2 is made of a noble metal (Au, Pt, Pd) with a low corrosion rate in the fuel cell environment because it will be not be removed later. Other materials that corrode but do not severely contaminate the cathode (e.g., C, W) may also be used. The getter can be applied as a thin metal mesh, or as a mixture of metal nanoparticles and ionomer using conventional techniques such as spray-coating, painting, or decal transfer. During a normal operation on hydrogen, methanol, or any other fuel, the getter electrode will be at a low potential. As components that leach from the anode pass by the getter, they may deposit on the getter due to the low potential between the anode and the getter. Thus, the components that leach from the anode will not reach the cathode, which would lower the cathode performance.

The electrochemical cell assembly may be, for example, a fuel cell such as a polymer electrolyte fuel cell. Such fuel cells may be a direct methanol fuel cell, a neat hydrogen fuel cell, a reformed hydrogen fuel cell, an alkaline fuel cell, or some other type of fuel cell.

In various embodiment assemblies of this invention, the first electrode and second electrode typically include one or more catalysts that are typically selected from appropriate transition metals that are known to facilitate electrochemistry. The composition of an electrode will depend on whether the electrode is expected to be an anode (where oxidation occurs) or a cathode (where reduction occurs). An anode may be comprised of a suitable transition metal or metals, such as platinum, or of alloys of platinum such as, but not limited to platinum/ruthenium alloys, platinum/nickel alloys, platinum/chromium alloys, and the like. The cathode may be comprised of at least one transition metal such as ruthenium, iron, chromium, cobalt, molybdenum, manganese, magnesium, nickel, osmium, rhodium, tungsten, rhenium, yttrium, titanium, and combinations thereof. Alternatively, cathode may comprise platinum, gold, iridium, palladium, or a platinum alloy such as, but not limited to, platinum/chromium, platinum/cobalt and platinum/iron alloys.

In another embodiment, a cathode comprises a cathode catalyst that comprises at least one transition metal and at least one chalcogen (e.g., sulfur, selenium, or tellurium). The at least one transition metal may be selected from the group consisting of ruthenium, osmium, rhenium, rhodium, platinum, palladium, cobalt, nickel, chromium, molybdenum, iron, manganese, vanadium, tungsten, and combinations thereof. The cathode catalyst may comprise at least one transition metal in elemental form capable of reducing oxygen and at least one chalcogen in solid elemental form disposed on the support (e.g., elemental selenium disposed on a ruthenium support). Alternatively, the cathode catalyst may comprise a transition metal chalcogenide (e.g., $RuSe_n$).

Some non-limiting examples of ion exchange membranes include proton exchange membranes, hydrocarbon membranes, and anion exchange membranes. Some examples of proton exchange membranes include, but are not limited to, poly (perfluorosulphonic acid) membranes, which are commercially available as Nafion®, Aciplex®, or Flemion®. Anion exchange membranes include, but are not limited to, hydroxide ion exchange membranes. The hydroxide ion exchange membranes include polymers having cation functional groups such as tetraalkylammonium, sulfonium, phosphonium, guanidinium, and imidazolium. In alternate embodiments, the ion exchange membranes may be replaced with a suitable liquid electrolyte. The liquid electrolyte may be selected from an aqueous acid solution such as perchloric acid or sulfuric acid. The liquid electrolyte may also be selected from an aqueous base solution such as potassium hydroxide, lithium hydroxide, sodium hydroxide, or ammonium hydroxide. The liquid electrolyte may also be selected from ionic liquids that include cations such as imidazolium, pyridinium, and ammonium or anions such as halides, phosphate, and triflate.

In one embodiment, the leachable component is a metal oxide such as, but not limited to, a metal oxide of ruthenium, iron, chromium, cobalt, molybdenum, manganese, magnesium, nickel, osmium, rhodium, tungsten, rhenium, yttrium, titanium, platinum, gold, iridium, and palladium.

The getters are each a metal electrode comprising at least one of ruthenium, iron, chromium, cobalt, molybdenum, manganese, magnesium, nickel, osmium, rhodium, tungsten, rhenium, yttrium, titanium, platinum, gold, iridium, palladium, and combinations thereof. A getter can have an open structure such as a mesh. In one embodiment, a mesh getter comprises at least one of platinum, gold, iridium, palladium, and combinations thereof. In another embodiment, the getters are composed of conductive nonmetals such as carbon.

A getter may be a disposable electrode or an electrode that can be otherwise be regenerated. A getter contaminated with leached components may be replaced with clean getter.

The removal of mobile leached components can be carried out at a suitable potential (for example, about 0.1 V) that is sufficient to permit selective migration of leached component to a "sacrificial" getter. Removal of such leached components improves electrode and fuel cell performance. Fuel cells in which leached components have been trapped by a getter or getters, thus minimizing contamination, are expected to exhibit longer lifetimes, greater current densities, and greater output than similar catalyst electrodes that are not treated by these methods.

A getter such as a mesh may allow for the flow of protons or anions (e.g. hydroxide ions) in a multi-getter arrangement. Such an arrangement can allow for installation of getters for multiple uses and minimizes a need for replacement of the getters. While a potentiostat can be used to apply potential for the removal of leached components, the present system and approach may allow for a system to generate current at a specific potential. Such generation of current may help remove leached components by electro-osmotic drag or a current assist transport mechanism.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A fuel cell assembly capable of preventing a component from an anode from contaminating a cathode of the assembly, comprising:
   an anode;
   a getter electrode capable of trapping components that leach from the anode, the getter electrode comprising a metal mesh structure;
   a cathode;
   an ion exchange membrane between the anode and the getter electrode;
   an ion exchange membrane between the getter electrode and the cathode; and
   means for applying an electric potential between the anode and the cathode and between the anode and the getter electrode.

* * * * *